United States Patent
Lin et al.

(10) Patent No.: US 11,974,311 B2
(45) Date of Patent: Apr. 30, 2024

(54) METHOD AND APPARATUS FOR CONFIGURING PRIORITY OF UCI

(71) Applicant: Hannibal IP LLC, Frisco, TX (US)

(72) Inventors: Wan-Chen Lin, Hualien (TW); Yu-Hsin Cheng, Hsinchu (TW); Heng-Li Chin, Taipei (TW); Hsin-Hsi Tsai, Taipei (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

(21) Appl. No.: 18/115,967

(22) Filed: Mar. 1, 2023

(65) Prior Publication Data

US 2023/0284249 A1    Sep. 7, 2023

Related U.S. Application Data

(63) Continuation of application No. 16/913,577, filed on Jun. 26, 2020, now Pat. No. 11,622,363.

(Continued)

(51) Int. Cl.
*H04W 4/00* (2018.01)
*H04L 1/1812* (2023.01)
(Continued)

(52) U.S. Cl.
CPC ......... *H04W 72/535* (2023.01); *H04L 1/1819* (2013.01); *H04L 5/0055* (2013.01);
(Continued)

(58) Field of Classification Search
CPC ............. H04W 72/10; H04W 72/1257; H04W 72/0446; H04W 72/042; H04W 72/0413; H04L 5/0053; H04L 5/0055
See application file for complete search history.

(56) References Cited

U.S. PATENT DOCUMENTS

| | | | |
|---|---|---|---|
| 11,622,363 | B2 | 4/2023 | Lin et al. |
| 2012/0140708 | A1 | 6/2012 | Choudhury et al. |

(Continued)

FOREIGN PATENT DOCUMENTS

| | | |
|---|---|---|
| CN | 1022579869 | 11/2011 |
| CN | 102752085 | 10/2012 |

(Continued)

OTHER PUBLICATIONS

CATT: "Corrections to UCI feedback procedures", 3GPP Draft; R1-1809713 Corrections to UCI Feedback Procedures, 3rd Generation Partnership Project (3GPP), 2018, vol. RAN WG1, No. Gothenburg, Sweden; Aug. 29, 2018-Aug. 24, 2018.

(Continued)

*Primary Examiner* — Bo Hui A Zhu
(74) *Attorney, Agent, or Firm* — Marcella M. Bodner; Cole Schotz, P.C.

(57) ABSTRACT

A method for wireless communication performed by a user equipment (UE) is provided. The method includes receiving, from a base station (BS), a Radio Resource Control (RRC) configuration to configure a first semi-persistent scheduling (SPS) physical downlink shared channel (PDSCH) and generating first uplink control information (UCI) in response to the first SPS PDSCH, where the RRC configuration includes a first parameter that indicates a priority of the first UCI.

8 Claims, 3 Drawing Sheets

Related U.S. Application Data

(60) Provisional application No. 62/866,796, filed on Jun. 26, 2019.

(51) Int. Cl.

| | | |
|---|---|---|
| *H04L 5/00* | (2006.01) | |
| *H04W 72/0446* | (2023.01) | |
| *H04W 72/21* | (2023.01) | |
| *H04W 72/23* | (2023.01) | |
| *H04W 72/50* | (2023.01) | |
| *H04W 72/56* | (2023.01) | |
| *H04W 76/27* | (2018.01) | |

(52) U.S. Cl.
CPC ....... *H04W 72/0446* (2013.01); *H04W 72/21* (2023.01); *H04W 72/23* (2023.01); *H04W 72/56* (2023.01); *H04W 76/27* (2018.02)

(56) References Cited

U.S. PATENT DOCUMENTS

| | | |
|---|---|---|
| 2016/0183290 A1 | 6/2016 | Ko et al. |
| 2018/0146460 A1 | 5/2018 | Lee et al. |
| 2019/0261391 A1 | 8/2019 | Kundu |
| 2020/0228248 A1 | 7/2020 | Islam |
| 2020/0296701 A1 | 9/2020 | Park |
| 2020/0413425 A1 | 12/2020 | Lin et al. |
| 2022/0046604 A1* | 2/2022 | Zhang .................. H04L 5/0037 |
| 2022/0225341 A1* | 7/2022 | Li ..................... H04W 28/0875 |

FOREIGN PATENT DOCUMENTS

| | | |
|---|---|---|
| CN | 109787712 | 5/2019 |
| CN | 114097290 | 2/2022 |
| EP | 3471489 | 4/2019 |
| EP | 3937567 A1 | 1/2022 |
| EP | 3991498 | 5/2022 |
| IN | 202247000488 | 1/2022 |
| WO | 2020259622 | 12/2020 |

OTHER PUBLICATIONS

CATT: "UL control enhancements for URLLC", 3GPP Draft; R1-1906328, 3rd Generation Partnership Project (3GPP), 2019, vol. RAN WG1, No. Reno, USA; May 13, 2019-May 17, 2019, Sophia-Antipolis Cedex ; France.

Samsung:"Specification Update on UL Control Incorporating Proposals in RAN1#94", 3GPP Draft; R1-1809707 38213—F20 Section 9.2, 3rd Generation Partnership Project (3GPP), 2018, vol. RAN WG1, No. Gothenburg, Sweden.

Extended European Search Report issued by the European Patent Office dated Jun. 28, 2023 in connection with corresponding European Patent Application No. 20831430.

Final Examination Report issued by the Indian Patent Office datedM ay 11, 2023 for corresponding Indian Patent Application No. 202247000488.

Non-Final Office Action dated Sep. 16, 2021 for corresponding U.S. Appl. No. 16/913,577.

Final Office Action dated Mar. 4, 2022 for corresponding U.S. Appl. No. 16/913,577.

Non-Final Office Action dated Aug. 10, 2022 for corresponding U.S. Appl. No. 16/913,577.

Notice of Allowance dated Dec. 8, 2022 for corresponding U.S. Appl. No. 16/913,577.

Issue Notification dated Apr. 4, 2023 for corresponding U.S. Appl. No. 16/913,577.

Alcatel-Lucent etc., UCI on PUSCH R1-104083, 3GPP TSG-RAN WG1#61bis, Jun. 23, 2010, the whole document.

International Preliminary Report on Patentability issued on Dec. 28, 2021 for International Patent Application No. PCT/CN20201098239.

International Search Report issued on Sep. 18, 2020, for International Patent Application No. PCT/CN2020/098239.

Written Opinion of the International Searching Authority issued on Sep. 18, 2020 for International Patent Application No. PCT/CN2020/098239.

* cited by examiner

METHOD AND APPARATUS FOR CONFIGURING PRIORITY OF UCI

CROSS-REFERENCE TO RELATED APPLICATION(S)

The present application is a continuation application of U.S. patent application Ser. No. 16/913,577, filed Jun. 26, 2020, now allowed and which claims the benefit of and priority of provisional U.S. Patent Application Ser. No. 62/866,796, filed on Jun. 26, 2019, ntitled "Method and apparatus for handling impact on introduction of new physical identification" ("the '796 provisional"). The disclosure of the '796 provisional is hereby incorporated fully by reference into the present disclosure.

FIELD

The present disclosure is related to wireless communication, and more particularly, to a method for configuring priority of uplink control information (UCI) in cellular wireless communication networks.

BACKGROUND

Various efforts have been made to improve different aspects of wireless communication for cellular wireless communication systems, such as fifth generation (5G) New Radio (NR) by improving data rate, latency, reliability, and mobility. In NR Technical Specification (TS) Release 15 (Rel-15), a modulation and coding scheme (MCS) MCS table (e.g., qam64lowSE) is introduced to schedule a more reliable data transmission. For grant-based physical downlink shared channel (PDSCH) transmissions, there are two ways to configure the qam64lowSE table. One is by extending an existing radio resource control (RRC) parameter mcs-Table in a PDSCH configuration (e.g., PDSCH-Config), and the other one is by configuring an MCS cell radio network temporary identifier (C-RNTI) (MCS-C-RNTI). For downlink (DL) semi-persistent scheduling (SPS) transmissions, only the RRC parameter mcs-Table in a SPS configuration (e.g., SPS-Config) can indicate whether or not the qam64lowSE table is configured. Furthermore, in NR Rel-15, a user equipment (UE) does not expect to transmit more than one physical uplink control channel (PUCCH) with hybrid automatic repeat request acknowledgement (HARQ-ACK) information in a slot. Thus, in Rel-15 there is no need to consider multiplexing, prioritization, or collision behavior on HARQ-ACK transmission for different service types within a slot for a UE. The different service types supported in 5G NR include enhanced Mobile Broadband (eMBB) and Ultra-Reliable Low-Latency Communication (URLLC). However, in Rel-16 and later releases, UCI messages may fully or partially overlap within a slot. The multiple UCI messages may include UCI for grant-based PDSCH transmissions and/or UCI for the SPS PDSCH transmissions. Therefore, there is a need for an improved and efficient mechanism for a UE to handle UCI collision within a slot.

SUMMARY

The present disclosure is related to a method performed by a UE in cellular wireless communication network for configuring the priority of the UCI.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to receive, from a BS, an RRC configuration to configure a first SPS PDSCH, and generate first UCI in response to the first SPS PDSCH, where the RRC configuration includes a first parameter that indicates a priority of the first UCI.

According to another aspect of the present disclosure, a method for wireless communication performed by a UE is provided. The method includes receiving, from a BS, an RRC configuration to configure a first SPS PDSCH, and generating first UCI in response to the first SPS PDSCH, where the RRC configuration includes a first parameter that indicates a priority of the first UCI.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
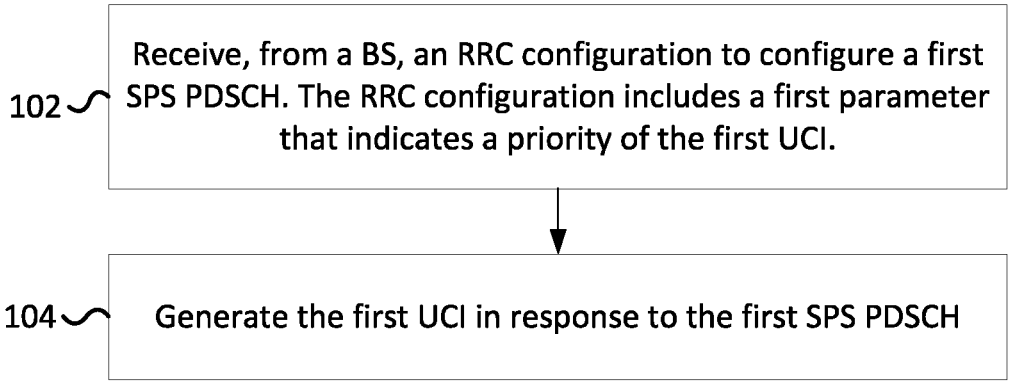
FIG. 1 is a flowchart of a method performed by a UE for configuring a priority of UCI for an SPS PDSCH according to an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be differed in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

A BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and uplink (UL) transmission data should be included in a transmission time interval (TTI) of a single NR frame. The respective portions of the DL transmission data, the guard period, and the UL transmission data should also be configurable based on, for example, the network dynamics of NR. Sidelink resources may also be provided in an NR frame to support ProSe services or V2X services.

Since at least two HARQ-ACK codebooks for supporting different service types may be simultaneously constructed for a UE, a physical identification for identifying a HARQ- ACK codebook may be necessary. For grant-based PDSCH, a new-RNTI may be the physical identification to help differentiate HARQ-ACK codebooks for different service types. In other words, the PDSCH transmission scheduled by a DL control information (DCI) scrambled with the new-RNTI may be regarded as the transmission with high priority, which may be linked to a specific HARQ-ACK codebook with a low-latency feedback. For a grant-based physical UL shared channel (PUSCH), the new-RNTI may be the identification to identify the behavior of UCI multiplexing. It should be noted that the present disclosure does not preclude other possible physical identifications. However, introducing the new-RNTI may lead to some impact on configuring the qam64lowSE table.

Possible impacts may include: a prioritized PDSCH or PUSCH transmission may be configured with the qam64lowSE low spectral efficiency table using RRC only signalling because configuration using the MCS-C-RNTI may not be usable; it may be too restrictive if a prioritized PDSCH transmission implies being configured with the qam64lowSE table because low latency services are not necessarily associated with high reliability; the physical identification for identifying HARQ-ACK feedback between grant-based PDSCH/PUSCH and DL SPS PDSCH/UL configured grant (CG) may remain unclear.

Based on the above-mentioned new-RNTI approach, scheduling the qam64lowSE table without the MCS-C-RNTI may need to be specified. Moreover, how to maintain the flexibility of scheduling different MCS tables upon receiving an assignment/grant indicated by a physical downlink control channel (PDCCH) scrambled with the new-RNTI may need to be clarified as well. Furthermore, a UE may validate or initiate a DL SPS assignment PDCCH or configured UL grant Type 2 PDCCH if the cyclic redundancy check (CRC) of the corresponding DCI is scrambled with a configured scheduling (CS) RNTI (CS-RNTI) and a new data indicator (NDI) field for the enabled transport block (TB) is set to zero. Thus, the priority of the SPS PDSCH reception or configured UL grant may not be identified based on the new-RNTI. Therefore, the general behavior of the physical identification for identifying the HARQ-ACK codebooks for different service types, grant based PDSCH, SPS PDSCH, and their UL counterparts may need to be specified. A physical identification may be a new DCI format, a new RNTI, or a new field in a DCI format. It should be noted that the present disclosure does not preclude other possible physical identifications (e.g., a new DCI field, a dedicated search space set, a new DCI format) for dynamically scheduling the MCS table.

Case 1: New RNTI for Priority Indication upon Dynamic MCS Table Adaptation

In one implementation, a new-RNTI may be introduced as the physical identification for identifying the HARQ-ACK codebooks for different service types. In one implementation, a PUSCH transmission scheduled by a DCI with CRC bits scrambled by the new-RNTI may indicate whether or not UCI multiplexing on PUSCH is allowed. For example, if a PUSCH transmission is scheduled by a DCI scrambled with the new-RNTI, no UCI is allowed to be multiplexed on the PUSCH in one implementation, whereas only UCI corresponding to a PDSCH scheduled by the DCI scrambled with the new-RNTI is allowed to be multiplexed on the PUSCH in another implementation. It should be noted that the new-RNTI may be a UE-specific RNTI that is applicable for a cell group or a transmission reception point (TRP) group configured for the UE. Several mechanisms to configure the qam64lowSE table or other tables that may possibly be introduced in the future upon the new-RNTI are disclosed below.

Case 1-1: Combine RRC Parameter mcs-Table in PDSCH-Config, PUSCH-Config, SPS-Config or ConfiguredGrantConfig with some Conditions of Transport Block Size (TBS)/Duration/Number of Physical Resource Block (PRB) of the Data Transmission For the PDSCH or PUSCH scheduled by a PDCCH with a DCI format with CRC scrambled by the new-RNTI or for the PDSCH or PUSCH scheduled without corresponding PDCCH transmission, a higher layer PDSCH configuration SPS-Config or PUSCH configuration ConfiguredGrantConfig is used:

Case 1-1-1: If the higher layer parameter mcs-Table given by PDSCH-Config, PUSCH-Config, SPS-Config or ConfiguredGrantConfig is set to 'qam64LowSE' or other tables for configuring data transmission with a low block error rate (BLER) requirement, the UE may check whether or not the TBS or the PDSCH/PUSCH duration or the number of allocated PRBs for the PDSCH/PUSCH is larger than a pre-defined or configured threshold value (e.g., configured via RRC signalling).

In one implementation, a configured threshold value for the PDSCH/PUSCH duration may be the number of symbols or the number of sub-slots. A sub-slot may include multiple symbols within a slot. Considering that data transmission indicated as high priority may not necessarily have a high reliability requirement, the data with a larger TBS, or a longer duration, or larger PRB number, or a combination of the above factors, may be regarded as a transmission that requires a high data rate.

In one implementation, if the TBS/duration/PRB number of the data transmission is larger than the threshold value, the UE may use an MCS index (e.g., $I_{MCS}$) and the 64QAM table (e.g., Table 5.1.3.1-1 in TS 38.214) to determine a modulation order and a target code rate used in the PDSCH or PUSCH; otherwise, the UE may follow the table configured using higher layer parameters (e.g., Table 5.1.3.1-3 in TS 38.214).

In another implementation, more MCS tables (for example, the 256QAM table in Table 5.1.3.1-2 in TS 38.214) may be considered and multiple threshold values are introduced. The threshold values may define the applicable range of individual MCS tables.

Case 1-1-2: If the higher layer parameter mcs-Table given by PDSCH-Config, PUSCH-Config, SPS-Config or ConfiguredGrantConfig is absent or the higher layer parameter mcs-Table given by PDSCH-Config, PUSCH-Config, SPS-Config or ConfiguredGrantConfig is set to 'qam256', the UE may check whether or not the TBS or the PDSCH/PUSCH duration or the number of allocated PRBs of a data transmission is smaller than a pre-defined threshold value or a configured threshold value (e.g., configured via RRC signalling).

In one implementation, a configured threshold value for the PDSCH/PUSCH duration may be the number of symbols or the number of sub-slots. Considering that data transmission indicated as high priority may also have a high reliability requirement, the data with a smaller TBS, or a shorter duration, or a smaller PRB number, or a combination of the above factors, may be regarded as a transmission that requires high reliability.

In one implementation, if the TBS/duration/PRB number of the data transmission is smaller than the threshold value, the UE may use $I_{MCS}$ and the qam64lowSE table (e.g. Table 5.1.3.1-3 in TS 38.214) or other tables for configuring a data transmission with a low BLER requirement to determine a modulation order and a target code rate used in the PDSCH or PUSCH; else, the UE may use the 64QAM table (e.g. Table 5.1.3.1-1 in TS 38.214).

Case 1-2: Handling of Medium Access Control (MAC) Control Elements (CEs)

Case 1-2-1: The network may indicate an MCS table for the PDSCH and/or PUSCH of a serving cell by sending an MCS table indication via a UE-specific PDSCH/PUSCH MAC CE. A UE-specific PDSCH/PUSCH MAC CE for the MCS table indication may be a specific indication to inform a UE which MCS table should be used. When the UE receives the MAC CE, the UE may apply a corresponding indication to the PDSCH/PUSCH transmission. In one implementation, respective MAC CE commands are provided for respective DL PDSCH and UL PUSCH transmission. In another implementation, a single MAC-CE command applies to both PDSCH and PUSCH.

In one implementation, when the UE receives the MCS table indication via UE-specific PDSCH/PUSCH MAC CE from the network, the MAC entity of the UE may implicitly indicate to lower layers the information regarding the MCS table indication for a UE-specific PDSCH/PUSCH MAC CE. In other words, the MCS table indication may include the range of applicable MCS (e.g., maximum applicable MCS and minimum applicable MCS; up to 64QAM or 256QAM) or the allowed MCS configuration instead of providing a specific instruction of an applied MCS table.

In one implementation, the MCS table indication received via the UE-specific PDSCH/PUSCH MAC CE may be identified by a MAC protocol data unit (PDU) subheader with a logical channel identifier (LCID). The MAC CE may have a variable size with following fields and may include either one or any combination of the information as provided below:

TRP ID: This field contains the TRP-Id of the TRP to which the MAC CE applies.
CORESET ID: This field contains the CORESET-Id of the control resource set (CORESET) containing scheduling information of the data channel to which the MAC CE applies.
Serving Cell ID: This field indicates the identity of the serving cell to which the MAC CE applies.
BWP ID: This field contains BWP-Id of a DL/UL bandwidth part (BWP) to which the MAC CE applies.
MCS table ID: This field indicates the MCS table identified by mcs-Table or mcs-Table-Id.
PDSCH/SPS: This field indicates whether the MCS table indication is for dynamic PDSCH scheduling or SPS scheduling.
PUSCH/Configured grant: This field indicates whether the MCS table indication is for dynamic PUSCH scheduling or configured grant scheduling.
PDSCH/PUSCH: This field indicates whether the MCS table indication is for the PDSCH or PUSCH.
SPS configuration ID: This field indicates to which SPS configuration the MCS table indication is applied.
Configured grant configuration ID: This field indicates to which configured grant configuration the MCS table indication is applied.

The mcs-Table parameter in PDSCH-Config, PUSCH-Config, SPS-Config or ConfiguredGrantConfig may be an integer to identify which table is applied, or an information element (IE) mcs-Table-Id may be configured. It should be noted that from the UE's perspective, the IE mcs-Table-Id may be cell specific, cell group specific or TRP specific. In addition, an MCS table index may be associated with a specific MCS table. For example, index 0 may refer to the 64QAM table, index 1 may refer to the 256QAM table, and index 2 may refer to the qam64lowSE table.

Case 1-2-2: The network may indicate an MCS table for the PDSCH (of a BWP and/or of a serving cell and/or a TRP) using higher layer parameters, and the parameter may be activated/deactivated by an MCS table Activation/Deactivation MAC CE. For example, if the activation status is verified and the MCS table is configured by the higher layer, the UE may apply the MCS table configured using the higher layer; otherwise the UE may use the default MCS table (for example, the 64QAM table). It should be noted that if a higher layer parameter (e.g., mcs-table) is absent, the UE may use the default MCS table regardless of the status of Activation/Deactivation MAC CE. In one implementation, the default MCS table may be the 64QAM table if the parameter mcs-table is absent. In one implementation, the default MCS table may be qam64LowSE table based upon the new-RNTI.

In one implementation, the MCS table Activation/Deactivation MAC CE may be identified by a MAC PDU subheader with an LCID. In one implementation, the MAC CE may have a fixed size of zero bit. In another implementation, the MAC CE may have a variable size with following fields to indicate the activation/deactivation status for different BWPs and/or different cells and/or different TRPs. The MAC CE may include either one or any combination of the information as provided below:

Activation/Deactivation: This field indicates the activation/deactivation status for the MCS table.
TRP ID: This field contains TRP-Id of the TRP to which the MAC CE applies.
CORESET ID: This field contains CORESET-Id of the CORESET containing scheduling information of the data channel to which the MAC CE applies.
Serving Cell ID: This field indicates the identity of the Serving Cell to which MAC CE applies.
BWP ID: This field contains BWP-Id of a DL BWP to which MAC CE applies.
MCS table ID: This field indicates the MCS table identified by mcs-Table or mcs-Table-Id.
PDSCH/SPS: This field indicates whether the MCS table indication is for dynamic PDSCH scheduling or SPS scheduling.
PUSCH/Configured grant: This field indicates whether the MCS table indication is for dynamic PUSCH scheduling or configured grant scheduling.
PDSCH/PUSCH: This field indicates whether the MCS table indication is for the PDSCH or PUSCH.
SPS configuration ID: This filed indicates to which SPS configuration the MCS table indication is applied.
Configured grant configuration ID: This field indicates to which configured grant configuration the MCS table indication is applied.

Case 1-2-3: The network may indicate an MCS table for the PDSCH (of a BWP and/or a serving cell and/or a TRP) using higher layer parameters. However, if the UE receives the MAC CE indication that indicates which MCS table should be applied, the UE may use the MCS table indicated by the MAC CE. For example, if the qam64lowSE table is configured by mcs-Table in PDSCH-Config, PUSCH-Config, SPS-Config or ConfiguredGrantConfig and the UE receives an MAC CE that indicates the 64QAM table, the UE may apply the 64QAM table to, for example, the PDSCH, PUSCH, the SPS PDSCH, or the CG PUSCH depending on which channel is indicated by the MAC CE. Also, MAC CE for MCS table indication may be applied when reconfiguration occurs. In other words, the priority of the MAC CE indication for the MCS table may be higher than the signalling from the RRC configuration for the MCS table.

Case 2: Priority Differentiation of Corresponding UCI Between Grant-Based PDSCH (e.g., PDSCH) and Grant-Free PDSCH (e.g., SPS PDSCH)

Several mechanisms for handling collision between UCI for grant-based PDSCH (e.g., HARQ-ACK information for the PDSCH) and UCI for grant-free PDSCH (e.g., HARQ-ACK information for the SPS PDSCH) with different priorities are provided below. It should be noted that the UCI may be transmitted on the PUCCH or PUSCH transmission. In one implementation, UCI transmitted by the UE may include the HARQ-ACK information in response to a PDSCH or a SPS PDSCH. It should be noted that "a transmission with high priority" or "a transmission is prioritized over other transmissions" in the present disclosure may mean a transmission that is transmitted by the UE when multiple transmissions overlap in the time domain (e.g., partial or full time domain resource allocation between different transmissions may be configured in the same symbol). Transmissions other than the one being identified as high priority may not be transmitted. In the following cases, the priority of UCI for the PDSCH may be identified by the new-RNTI (e.g., UCI corresponding to the PDSCH with CRC scrambled by the new-RNTI may be regarded as high priority) or by other physical identifications (e.g., a DCI field, a new DCI format).

Case 2-1: Collision Between UCI for PDSCH Scheduled by DCI with CRC Scrambled by the New-RNTI and UCI for the SPS PDSCH Identified as a Transmission with High Priority In one implementation, UCI for the PDSCH and UCI for the SPS PDSCH may both be identified as high priority transmissions using different physical identifications. In one implementation, UCI for the PDSCH may be identified as high priority using the new-RNTI and UCI for the SPS PDSCH may be identified as the transmission with high priority among UCI for overlapped multiple active SPS PDSCHs. In other words, UCI for the PDSCH scheduled by DCI with CRC scrambled by the new-RNTI may be regarded as high priority transmission when collision occurs between UCI for the PDSCH with the new-RNTI and UCI for the PDSCH with C-RNTI or MCS-C-RNTI in case 2-1.

Case 2-1-1: In one implementation, the priority of UCI for a dynamically scheduled PDSCH (e.g., PDSCH) may always be regarded as higher than the priority of UCI for an SPS PDSCH since the priority between the PDSCH and SPS PDSCH has not been specified. For example, when collision occurs between UCI for the PDSCH and UCI for the SPS PDSCH, the UCI for the PDSCH may be prioritized. In one implementation, although the UCI for the PDSCH and SPS PDSCH are both identified as high priority transmissions (e.g., the PDSCH and the SPS PDSCH may use different physical identifications to indicate priority), the UCI corresponding to the PDSCH may always be prioritized over the UCI corresponding to SPS PDSCH when collision occurs.

Case 2-1-2: In one implementation, multiple active SPS configurations may be supported, and each SPS configuration may have a corresponding index. An SPS PDSCH corresponding to a specific index may be regarded as the prioritized PDSCH. In one implementation, an SPS PDSCH with a specific index (e.g., index 0) among multiple active SPS PDSCHs may be prioritized over other SPS PDSCHs with other indexes when collision occurs. In one implementation, the SPS PDSCH corresponding to a configuration with index 0 may be the prioritized SPS PDSCH, and UCI for the SPS PDSCH configured with index 0 may be prioritized when collision occurs between UCI for the PDSCH and the UCI for the SPS PDSCH with index 0. In one implementation, the SPS PDSCH corresponding to a configuration with index 0 may be the prioritized SPS PDSCH among multiple active SPS PDSCHs if multiple active SPS PDSCHs overlap, and the UCI for the SPS PDSCH configured with index 0 may have the same priority as UCI for the PDSCH when collision occurs. In one implementation, both the UCI for the SPS PDSCH with index 0 and the UCI for the PDSCH may be regarded as high priority transmissions, and the priority between the UCIs may not be necessary.

Case 2-1-3: In one implementation, a priority of UCI for an SPS PDSCH may be configured by a parameter in an SPS configuration (e.g., SPS-Config). In one implementation, if the specific parameter for identifying the priority is configured in SPS-Config, UCI for the SPS PDSCH corresponding to the SPS-Config with the specific parameter may be prioritized when collision occurs between UCI for dynamic PDSCH and the UCI for the SPS PDSCH. In one implementation, the configured parameter may identify the priority of the UCI for the corresponding SPS PDSCH, and the UCI for the SPS PDSCH identified as high priority may be prioritized over the UCI for the PDSCH. In one implementation, if the specific parameter for identifying the priority is configured in SPS-Config, the UCI for the SPS PDSCH corresponding to the SPS-Config with the specific parameter may have the same priority as the UCI for the PDSCH when collision occurs. In one implementation, the configured parameter may identify the priority of the UCI for the corresponding SPS PDSCH, and the UCI for the SPS PDSCH identified as high priority may have the same priority as the UCI for the PDSCH. In one implementation, both UCI for the SPS PDSCH and UCI for the PDSCH may be identified as high priority transmissions using different physical identifications and further comparison between the priority of UCI for the PDSCH and that of UCI for the SPS PDSCH may not be necessary.

Case 2-1-4: In one implementation, a field in a DCI format that indicates activation of the SPS PDSCH may be used to indicate a priority order between a PDSCH and an SPS PDSCH. The field may be a new field or a reused field in the DCI format. In one implementation, the new field may include one bit to indicate whether or not the activated SPS PDSCH is prioritized. For example, the bit having a value of '1' may be regarded as 'a prioritized SPS PDSCH' (e.g., high priority), whereas the bit having a value of '0' may be regarded as 'a deprioritized SPS PDSCH' (e.g., low priority transmission). Alternatively, the bit having a value of '0' may be regarded as 'a prioritized SPS PDSCH', whereas the bit having a value of '1' may be regarded as 'a deprioritized SPS PDSCH'. In one implementation, an existing field in the DCI format may be reused. The UE may validate the prioritized SPS PDSCH based on the existing field in the DCI format. In one implementation, UCI for the SPS PDSCH corresponding to the DCI with the specific field that indicates the priority may be prioritized when collision occurs between UCI for the PDSCH and the UCI for the SPS PDSCH. In one implementation, the UCI for the SPS PDSCH corresponding to the DCI with the specific field may have the same priority as the UCI for the PDSCH when collision occurs.

Case 2-1-5: The priority may depend on the periodicity scheduled in the SPS configuration (e.g., SPS-Config). In one implementation, if the periodicity in the SPS-Config is smaller than a threshold value (e.g., 2 symbols), UCI for the SPS PDSCH may be prioritized when collision occurs between UCI for a PDSCH and the UCI for the SPS PDSCH. In one implementation, the UCI for the SPS PDSCH with periodicity smaller than the threshold value may have the same priority as the UCI for the PDSCH when collision occurs.

Case 2-1-6: The priority may depend on a K1 value for an SPS PDSCH. In one implementation, UCI for a PDSCH transmission with the K1 value smaller than a threshold value (e.g., 2 symbols) may be prioritized when collision occurs between UCI for the PDSCH and UCI for the SPS PDSCH. The K1 value may indicate a time offset between a given PDSCH and the corresponding HARQ-ACK information. In one implementation, K1 may be the number of slots/sub-slots from the slot/sub-slot containing the end of the PDSCH to the slot/sub-slot containing the start of the PUCCH with HARQ-ACK information. In one implementation, the UCI for the SPS PDSCH with the K1 value smaller than the threshold value may have the same priority as the UCI for the PDSCH when collision occurs.

Implementations described in cases 2-1-1 through 2-1-6 may be a separate method respectively or may be combined to form a specific method.

Case 2-2: Collision Between UCI for PDSCH Scheduled by DCI Scrambled with C-RNTI and UCI for the SPS PDSCH Identified as a Transmission with High Priority In one implementation, UCI for the PDSCH and UCI for the SPS PDSCH may both be identified as high priority transmissions using different physical identifications. In one implementation, UCI for the PDSCH may be identified as low priority transmission and UCI for the SPS PDSCH may be identified as high priority. In one implementation, UCI for the PDSCH may be identified as high priority using other physical identifications (e.g., a DCI field, a new DCI format) and UCI for the SPS PDSCH may be identified as the transmission with high priority among UCI for overlapped multiple active SPS PDSCHs.

Case 2-2-1: In one implementation, multiple active SPS configurations may be supported, and each SPS configuration may have a corresponding index. An SPS PDSCH corresponding to a specific index may be regarded as the prioritized PDSCH. For example, among three SPS PDSCHs having index 0, index 1, and index 2 respectively, the SPS PDSCH with index 0 may have the highest priority. In one implementation, the SPS PDSCH corresponding to a configuration with index 0 may be regarded as the prioritized SPS PDSCH in comparison with an SPS PDSCH corresponding to a configuration with index other than 0. The UCI for the SPS PDSCH configured with index 0 may be prioritized when collision occurs between the UCI for the PDSCH and the UCI for the SPS PDSCH. The UCI for the PDSCH may be indicated as low priority transmission or high priority transmission without using the new-RNTI (e.g., priority indication using a DCI field or a new DCI format). In one implementation, both the UCI for the SPS PDSCH with index 0 and the UCI for the PDSCH may be regarded as high priority transmissions, and the priority between the UCIs may not be necessary.

Case 2-2-2: In one implementation, a priority of UCI for an SPS PDSCH may be configured by a parameter in an SPS configuration (e.g., SPS-Config). In one implementation, if the specific parameter for identifying the priority is configured in SPS-Config (e.g., the parameter indicates whether the priority of the UCI for the SPS PDSCH is high or low), the UCI for the SPS PDSCH corresponding to the SPS-Config with the specific parameter may be prioritized when collision occurs between UCI for the PDSCH and the UCI for the SPS PDSCH. In one implementation, the configured parameter may identify the priority of the UCI for the corresponding SPS PDSCH, and the UCI for the SPS PDSCH identified as high priority may be prioritized over the UCI for the PDSCH. The UCI for the PDSCH may be indicated as low priority transmission or high priority transmission (e.g., priority indication using a field in DCI or a new DCI format). In one implementation, a priority of the UCI for the PDSCH may be indicated by a field in a DCI format that schedules the PDSCH reception. The UE may determine whether to prioritize the UCI for the PDSCH or the UCI for the SPS PDSCH based on the priority of the respective UCI.

Case 2-2-3: In one implementation, a field in a DCI format that indicates activation of the SPS PDSCH may be used to indicate a priority order between a PDSCH and an SPS PDSCH. The field may be a new field or a reused field in the DCI format. In one implementation, the new field may include one bit to indicate whether or not the activated SPS PDSCH is prioritized. For example, the bit having a value of '1' may be regarded as 'a prioritized SPS PDSCH', whereas the bit having a value of '0' may be regarded as 'a deprioritized SPS PDSCH'. Alternatively, the bit having a value of '0' may be regarded as 'a prioritized SPS PDSCH', whereas the bit having a value of '1' may be regarded as 'a deprioritized SPS PDSCH'. In one implementation, an existing field in the DCI format may be reused. The UE may validate the prioritized SPS PDSCH based on the existing field in the DCI format. In one implementation, UCI for the SPS PDSCH corresponding to the DCI with the specific field that indicates the priority may be prioritized when collision occurs between UCI for the PDSCH and the UCI for the SPS PDSCH.

Case 2-2-4: The priority may depend on the periodicity scheduled in the SPS configuration (e.g., SPS-Config). In one implementation, if the periodicity in the SPS-Config is smaller than a threshold value (e.g., 2 symbols), UCI for the SPS PDSCH may be prioritized when collision occurs between UCI for a PDSCH and the UCI for the SPS PDSCH.

Case 2-2-5: The priority may depend on a K1 value for an SPS PDSCH. In one implementation, UCI for a PDSCH transmission with the K1 value smaller than a threshold value (e.g., 2 symbols) may be prioritized when collision occurs between UCI for the PDSCH and UCI for the SPS PDSCH.

Implementations described in cases 2-2-1 through 2-1-5 may be a separate method respectively or may be combined to form a specific method.

FIG. 1 is a flowchart of a method 100 performed by a UE for configuring a priority of UCI for an SPS PDSCH according to an example implementation of the present disclosure. In action 102, the UE may receive, from a BS, an RRC configuration to configure a first SPS PDSCH. For example, the RRC configuration may include an IE SPS-Config. The UE may also receive a DCI format with CRC bits scrambled by CS-RNTI to activate the first SPS PDSCH. After the first SPS PDSCH is activated, the UE may receive a PDSCH periodically without receiving a corresponding PDCCH. The periodicity of the SPS PDSCH may be indicated in the RRC configuration.

In action 104, the UE may generate first UCI in response to the first SPS PDSCH. The first UCI may include HARQ-ACK information for the first SPS PDSCH, such as ACK/NACK feedback to the BS. The RRC configuration received in action 102 may include a first parameter that indicates a priority of the first UCI. The UE may generate a HARQ- ACK codebook that is associated with the priority indicated by an explicit indication (e.g., the first parameter) in the RRC configuration.

Figure 2:
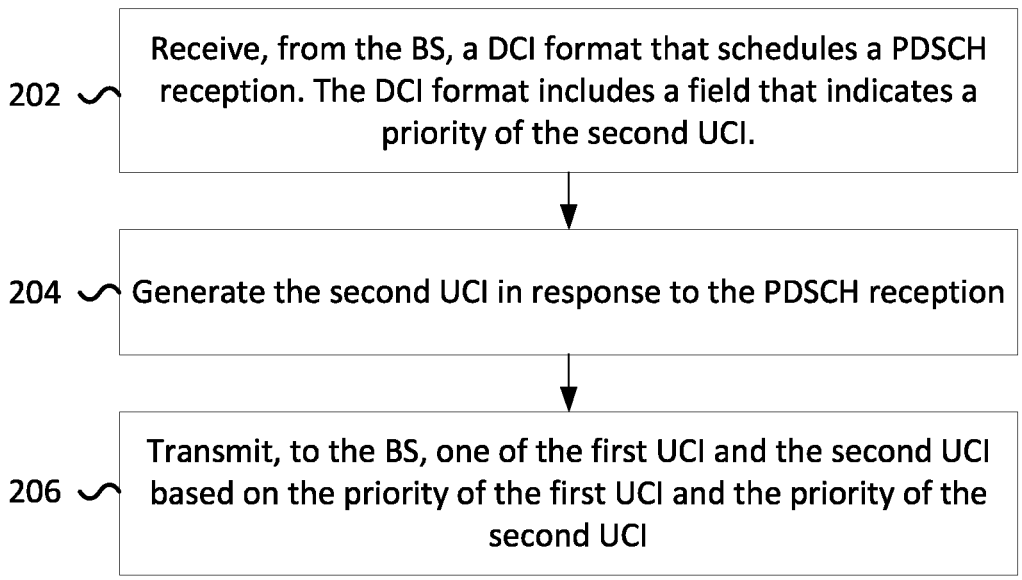
FIG. 2 is a flowchart of a method performed by a UE for configuring a priority of UCI for a dynamic PDSCH according to an example implementation of the present disclosure.

FIG. 2 is a flowchart of a method 200 performed by a UE for configuring a priority of UCI for a PDSCH according to an example implementation of the present disclosure. In action 202, the UE may receive, from the BS, a DCI format that schedules a PDSCH reception. The DCI format in action 202 may have CRC bits scrambled by C-RNTI. In action 204, the UE may generate second UCI in response to the PDSCH reception. The second UCI may include HARQ-ACK information for the PDSCH reception. The DCI format received in action 202 may include a field that indicates a priority of the second UCI. The UE may generate a HARQ-ACK codebook that is associated with the priority indicated by the DCI format.

Action 206 may be optionally performed by the UE. In one implementation, action 206 may be performed by the UE when the first UCI generated in action 104 in FIG. 1 and the second UCI generated in action 204 partially or fully overlap in the time domain (also referred to as UCI collision). In one implementation, the UCI collision may occur when the first UCI and the second UCI are to be transmitted in a same slot. In action 206, the UE may transmit, to the BS, one of the first UCI and the second UCI based on the priority of the first UCI and the priority of the second UCI. For example, the UE may transmit the first UCI if the first UCI has a higher priority than the second UCI, and vice versa. In one implementation, the UE may transmit both the first UCI and the second UCI if the first UCI and the second UCI have the same priority.

Figure 3:
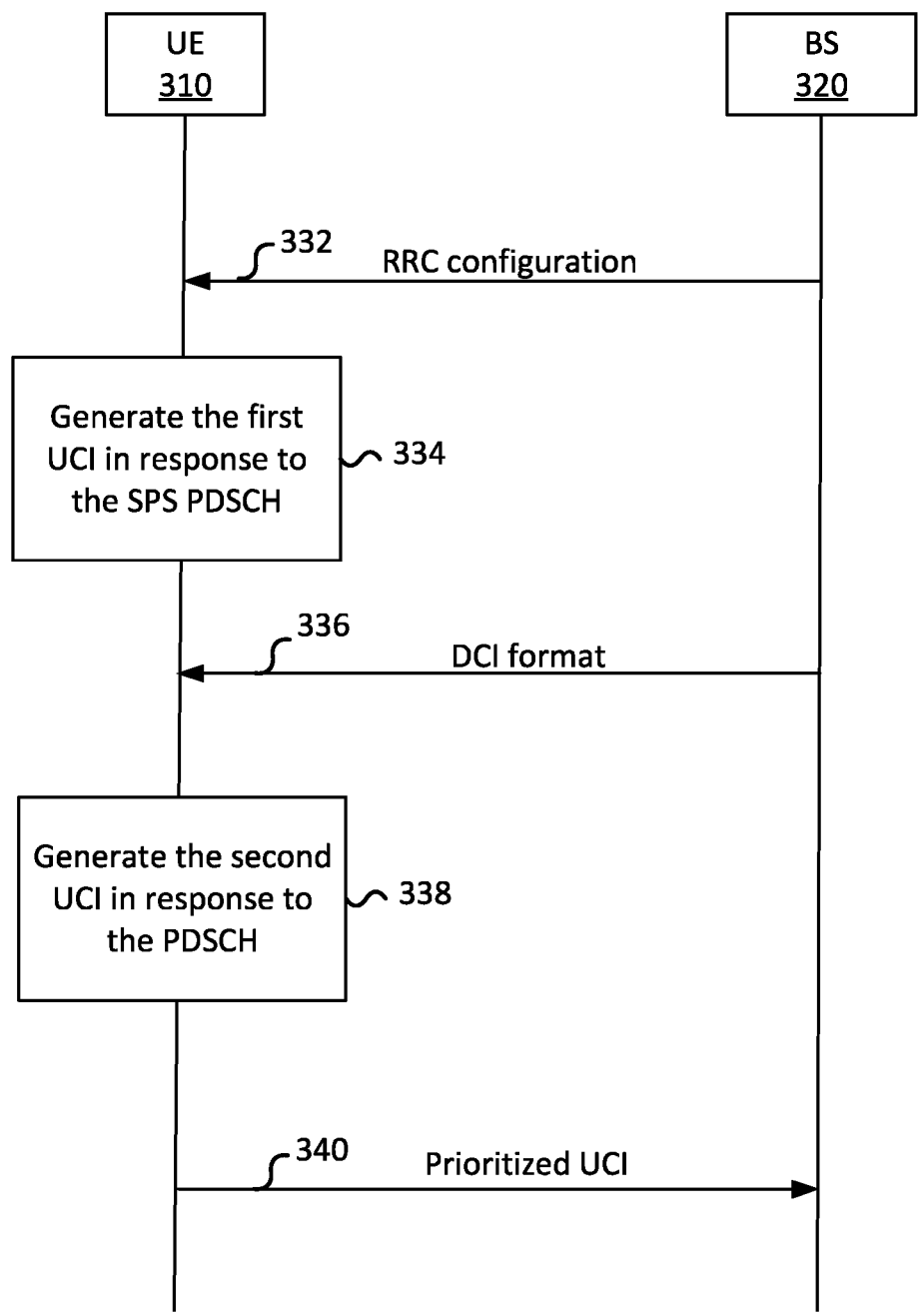
FIG. 3 is a diagram illustrating a procedure for handling UCI collision according to an example implementation of the present disclosure.

FIG. 3 is a diagram 300 illustrating a procedure for handling UCI collision according to an example implementation of the present disclosure. In action 332, the UE 310 receives an RRC configuration from the BS 320 to configure a SPS PDSCH. In action 334, the UE 310 generates the first UCI in response to the SPS PDSCH. In action 336, the UE 310 receives a DCI format that schedules a PDSCH. In action 338, the UE 310 generates the second UCI in response to the PDSCH. In action 340, the UE 310 may transmit a prioritized UCI to the BS 320 based on the priority of the first UCI and the priority of the second UCI after determining that the first UCI and the second UCI partially or fully overlap in the time domain. Actions shown in FIG. 3 should not be construed as necessarily order dependent. The order in which the process is described is not intended to be construed as a limitation. For example, action 338 may be performed before action 334 in other implementations. That is, the second UCI may be generated before the first UCI is generated.

It should be noted that UCI collision may also occur between UCI for a first SPS PDSCH and UCI for a second SPS PDSCH when multiple activated SPS PDSCH configurations are supported by the UE. In one implementation, the RRC configuration received in action 102 in FIG. 2 may indicate a priority of the first UCI for the first SPS PDSCH and a priority of the second UCI for the second SPS PDSCH. The UE may transmit a prioritized UCI based on the priority of the first UCI and the priority of the second UCI when the first UCI for the first SPS PDSCH and the second UCI for the second SPS PDSCH partially or fully overlap in the time domain.

In one implementation, multiple activated SPS PDSCH configurations may be supported by the UE, and the UE may need to handle collision between multiple activated SPS PDSCHs. The UE may receive, from the BS, an RRC configuration to configure a second SPS PDSCH. In one implementation, the RRC configuration may be the same as that received in action 102 in FIG. 1 for configuring the first SPS PDSCH. The RRC configuration may include a second parameter that indicates a prioritized SPS PDSCH when the first SPS PDSCH and the second SPS PDSCH partially or fully overlap in the time domain.

In one implementation, the second parameter may be a specific priority index, which may be an integer greater than or equal to 0. An SPS PDSCH associated with the specific priority index may be regarded as the prioritized PDSCH. In one implementation, the second parameter for the prioritized SPS PDSCH may correspond to index 0. That is, the SPS PDSCH associated with index 0 may be regarded as the prioritized SPS PDSCH.

Figure 4:
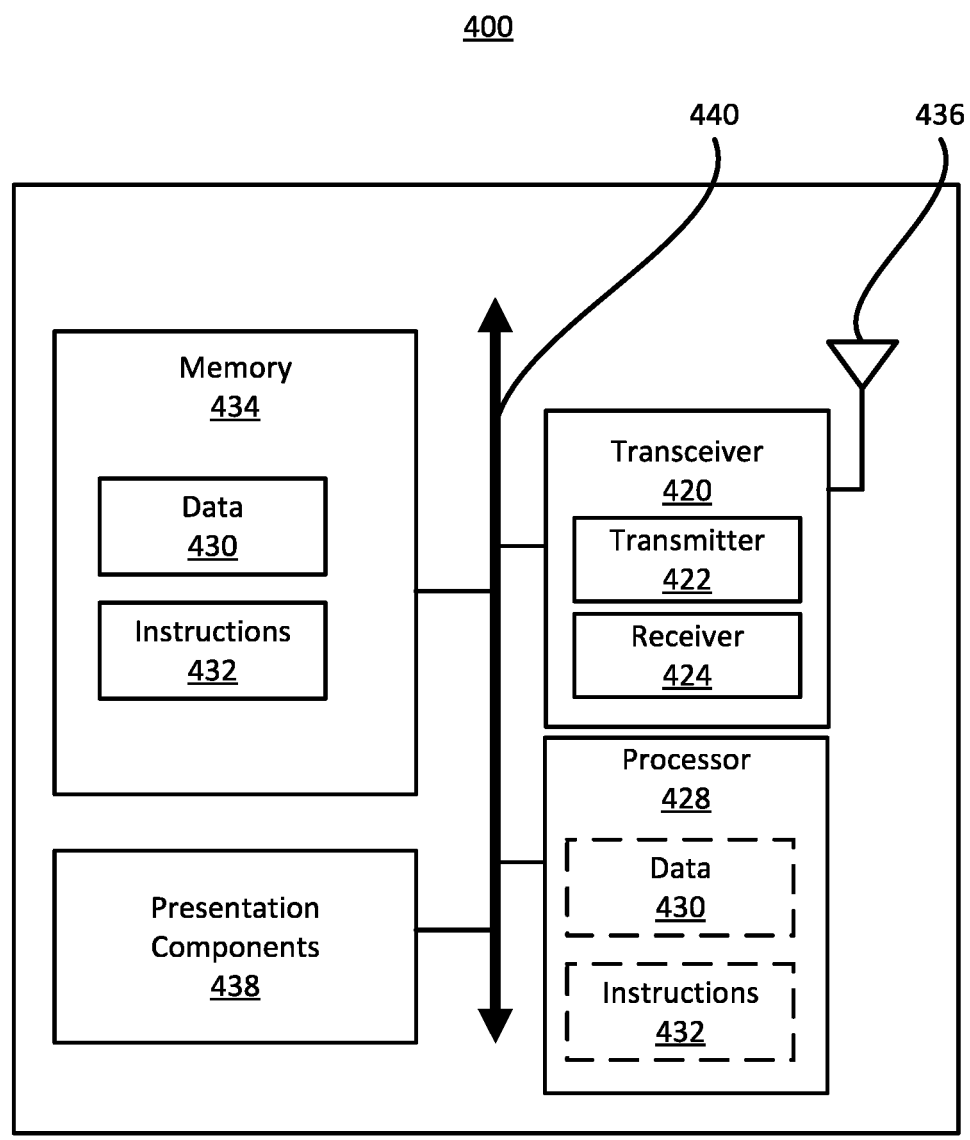
FIG. 4 is a block diagram illustrating a node for wireless communication in accordance with various aspects of the present disclosure.

FIG. 4 is a block diagram illustrating a node for wireless communication according to the present disclosure. As illustrated in FIG. 4, a node 400 may include a transceiver 420, a processor 428, a memory 434, one or more presentation components 438, and at least one antenna 436. The node 400 may also include an RF spectrum band module, a BS communications module, a network communications module, and a system communications management module, Input/Output (I/O) ports, I/O components, and a power supply (not shown in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory includes solid-state memory, hard drives, optical-disc drives, etc. As illustrated in FIG. 4, the memory 434 may store computer-readable, computer-executable instructions 432 (e.g., software codes) that are configured to cause the processor 428 to perform various functions disclosed herein, for example, with reference to FIGS. 1 through 3. Alternatively, the instructions 432 may not be directly executable by the processor 428 but be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process data 430 and the instructions 432 received from the memory 434, and information transmitted and received via the transceiver 420, the base band communications module, and/or the network communications module. The processor 428 may also process information to be sent to the transceiver 420 for transmission via the antenna 436 to the network communications module for transmission to a core network.

One or more presentation components 438 present data indications to a person or another device. Examples of presentation components 438 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
one or more non-transitory computer-readable media containing computer-executable instructions embodied therein; and
at least one processor coupled to the one or more non-transitory computer-readable media, the at least one processor configured to execute the computer-executable instructions to:
receive, from a base station (BS), a first Radio Resource Control (RRC) configuration to configure a first semi-persistent scheduling (SPS) physical downlink shared channel (PDSCH), the first RRC configuration comprising a first parameter indicating its relative priority for when the first SPS PDSCH overlaps with another SPS PDSCH in a time domain; and
receive, from the BS, a second RRC configuration to configure a second SPS PDSCH, the second SPS PDSCH overlapping the first SPS PDSCH in a time domain, the second RRC configuration comprising a second parameter indicating its relative priority for when the second SPS PDSCH overlaps with another SPS PDSCH in the time domain;
when the first SPS PDSCH and the second SPS PDSCH overlap in the time domain, prioritize one of the first SPS PDSCH and the second SPS PDSCH based on a comparison of the first parameter and the second parameter; and
generate a first uplink control information (UCI) corresponding to the prioritized SPS PDSCH.

2. The UE of claim 1, wherein the at least one processor is further configured to execute the computer-executable instructions to:
receive, from the BS, a downlink control information (DCI) format that schedules a PDSCH reception; and
generate a second UCI in response to the PDSCH reception;
wherein the DCI format includes a field that indicates a priority of the second UCI.

3. The UE of claim 2, wherein the first UCI and the second UCI overlap in a time domain, and the at least one processor is further configured to execute the computer-executable instructions to:
transmit, to the BS, one of the first UCI and the second UCI based on a comparison of a priority of the first UCI and the priority of the second UCI.

4. The UE of claim 1, wherein the first UCI includes hybrid automatic repeat request acknowledgement (HARQ-ACK) information.

5. A method for wireless communication performed by a user equipment (UE), the method comprising:
receiving, from a base station (BS), a first Radio Resource Control (RRC) configuration to configure a first semi-persistent scheduling (SPS) physical downlink shared channel (PDSCH), the first RRC configuration comprising a first parameter indicating its relative priority for when the first SPS PDSCH overlaps with another SPS PDSCH in a time domain;
receiving, from the BS, a second RRC configuration to configure a second SPS PDSCH, the second SPS PDSCH overlapping the first SPS PDSCH in a time domain, the second RRC configuration comprising a second parameter indicating its relative priority for when the second SPS PDSCH overlaps with another SPS PDSCH in the time domain;
when the first SPS PDSCH and the second SPS PDSCH overlap in the time domain, prioritizing one of the first SPS PDSCH and the second SPS PDSCH based on a comparison of the first parameter and the second parameter; and
generating a first uplink control information (UCI) corresponding to the prioritized SPS PDSCH.

6. The method of claim 5, further comprising:
receiving, from the BS, a downlink control information (DCI) format that schedules a PDSCH reception; and
generating a second UCI in response to the PDSCH reception;
wherein the DCI format includes a field that indicates a priority of the second UCI.

7. The method of claim 6, wherein the first UCI and the second UCI overlap in a time domain, the method further comprising:
transmitting, to the BS, one of the first UCI and the second UCI based on a comparison of a priority of the first UCI and the priority of the second UCI.

8. The method of claim 5, wherein the first UCI includes hybrid automatic repeat request acknowledgement (HARQ-ACK) information.

\* \* \* \* \*